F. N. WOODS.
ELECTRIC WIRE FEEDING APPARATUS AND REEL THEREFOR.
APPLICATION FILED JUNE 7, 1911.
1,018,599.
Patented Feb. 27, 1912.
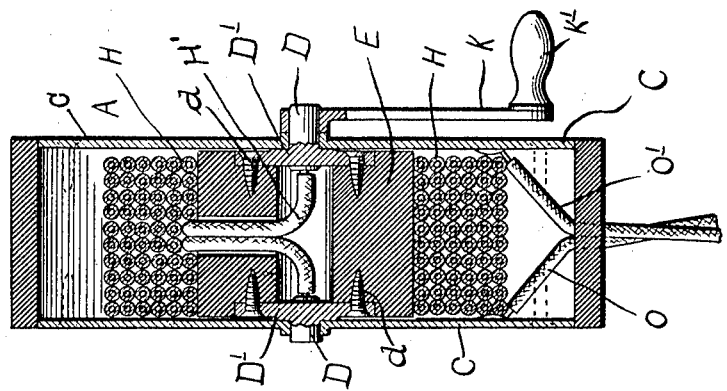
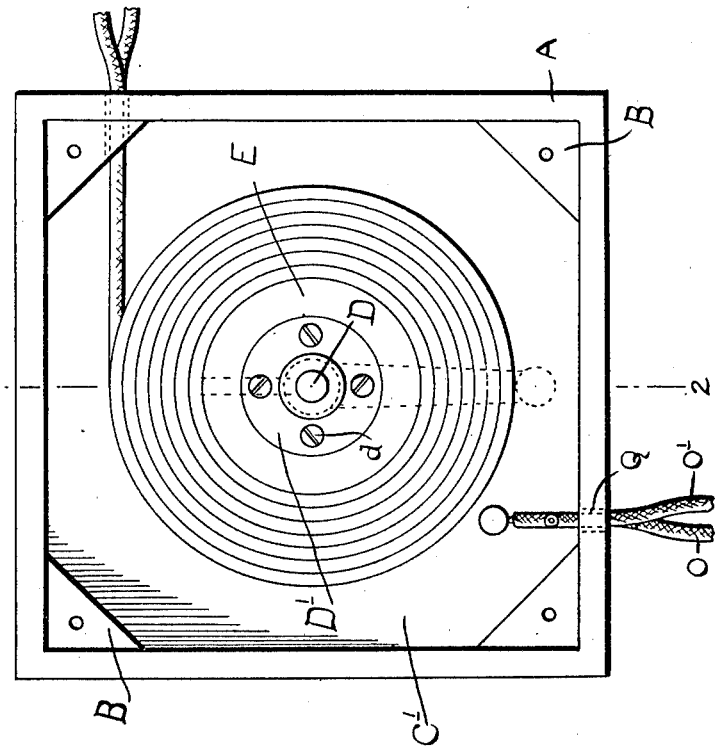
WITNESSES:
INVENTOR
Attorney

UNITED STATES PATENT OFFICE.

FRANK NEWTON WOODS, OF FLINT, MICHIGAN.

ELECTRIC-WIRE-FEEDING APPARATUS AND REEL THEREFOR.

1,018,599.  Specification of Letters Patent.  Patented Feb. 27, 1912.

Application filed June 7, 1911. Serial No. 631,808.

*To all whom it may concern:*

Be it known that I, FRANK NEWTON WOODS, a citizen of the United States, residing at Flint, in the county of Genesee and State of Michigan, have invented certain new and useful Improvements in Electric-Wire-Feeding Apparatus and Reel Therefor; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in reels for holding electrical wire and providing means for feeding the wire upon the reel with a current of electricity.

The invention comprises various details of construction and combinations and arrangements of parts which will be hereinafter fully described and then specifically defined in the appended claims.

I illustrate my invention in the accompanying drawings, in which:—

Figure 1 is a side elevation of the casing containing my improved wire holding reel, one face of the casing being removed, and Fig. 2 is a sectional view on line 2—2 of Fig. 1.

Reference now being had to the details of the drawings by letter, A designates a casing having corner brackets B of insulating material upon which the plates C and C', forming the opposite faces of the casing, are mounted. Said plate C' is a positive plate and the plate C is negative. Each of said plates is provided with an aperture forming a bearing for the trunnion D integral with a metallic plate D'.

E designates a cylinder which is recessed upon its opposite faces for the reception of the plates D' which latter are fastened by means of screws *d*.

Winding about the reel are the wires H and H', the former being connected to the plate D' which in turn is electrically in contact with the negative plate C and the wire H' with the trunnion D which is connected to the positive plate C'. Supply wires designated by letters O and O' lead through an opening Q in the casing and connect the former with the negative plate C and the latter with the positive plate C', forming means whereby a current is supplied to the wire, it being understood that the plates C and C' are insulated from each other and each electrically in contact with one of said trunnions upon the plates D', one of which is connected with the wire H and the other with the wire H'.

From the foregoing, it will be noted that, by the provision of an apparatus as shown and described, a simple and efficient means is afforded whereby a coil of electric wire may be conveniently wound upon the reel and a supply of electric current fed thereto and, by the provision of the reel, the wires may be left out at any desired distance limited by the length of the wire and, when it is desired to rewind the wire, it may be done by means of said crank.

What I claim to be new is:—

1. A reel for electric wire, a bearing for said reel and means for feeding the wire with electrical energy comprising a casing having metallic plates forming the sides of the casing and insulated from each other, said reel having metallic trunnions mounted in said bearing, electrical wires winding upon the reel and electrically connected to said trunnions, and supply wires connected one to each of said metallic plates.

2. A reel for electric wire and means for feeding the wire with electrical energy comprising a casing having metallic plates forming the sides of the casing and insulated from each other, bearing plates fastened to said reel and each having a trunnion journaled in one of said plates forming the sides of the casing, wires winding about the reel and one connected to each of said bearing plates, a feed wire connected to the side plates of the casing, and a crank fastened to one of the trunnions.

3. A reel for electric wire and means for feeding the wire with electrical energy comprising a casing having metallic plates forming the sides of the casing and insulated from each other, said reel having recesses in opposite faces, a trunnion carrying plate seated in each recess and having an integral trunnion journaled in one of said plates forming the side of the casing, wires winding upon the reel and one connected to each of the trunnion carrying plates, feed wires passing through the casing and one connected to each of the plates of the casing.

In testimony whereof I hereunto affix my signature in the presence of two witnesses.

FRANK NEWTON WOODS.

Witnesses:
De Hull N. Travis,
Kate Fitzsimmons.

Copies of this patent may be obtained for five cents each, by addressing the "Commissioner of Patents, Washington, D. C."